United States Patent [19]

White

[11] Patent Number: 4,467,421
[45] Date of Patent: Aug. 21, 1984

[54] VIRTUAL STORAGE SYSTEM AND METHOD

[75] Inventor: Barry B. White, Boulder, Colo.

[73] Assignee: Storage Technology Corporation, Louisville, Colo.

[21] Appl. No.: 384,381

[22] Filed: Jun. 2, 1982

Related U.S. Application Data

[63] Continuation-in-part of Ser. No. 261,950, May 8, 1981, , and Ser. No. 85,909, Oct. 18, 1979.

[51] Int. Cl.$^3$ .............................................. G06F 13/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 4,035,778 | 7/1977 | Ghanem | 364/200 |
| 4,077,059 | 2/1978 | Cordi et al. | 364/200 |
| 4,084,228 | 4/1978 | Dufond et al. | 364/200 |
| 4,091,455 | 5/1978 | Woods et al. | 364/200 |
| 4,096,567 | 6/1978 | Millard | 364/200 |
| 4,189,770 | 2/1980 | Gannon et al. | 364/200 |

OTHER PUBLICATIONS

*Systems Programming*, written by John Donovan, McGraw-Hill Book Company, 1972, pp. 407–420.

*Primary Examiner*—Raulfe B. Zache
*Attorney, Agent, or Firm*—Woodcock Washburn Kurtz Mackiewicz & Norris

[57] ABSTRACT

A virtual storage system for use in conjunction with a host computer is disclosed. The system features a memory control processor external to the host computer which divides user-defined data sets into blocks of a size convenient for storage on, e.g., magnetic media and individually assigns these blocks to locations determined external to the host. In this way, the extent of a particular data file is not specified by the user; nor is empty space allocated in anticipation of future use. The virtual memory system may additionally comprise a high speed cache memory for receiving data written to the memory system at high speed from the host. Data anticipated to be the subject of future requests can be staged to the cache, so that it can be supplied to the host at high speed, thus improving system performance. Data compression and decompression may be incorporated in the storage system. Numerous data back-up and automated recovery processing operations may additionally be performed by this system without specific instruction from the host.

30 Claims, 14 Drawing Figures

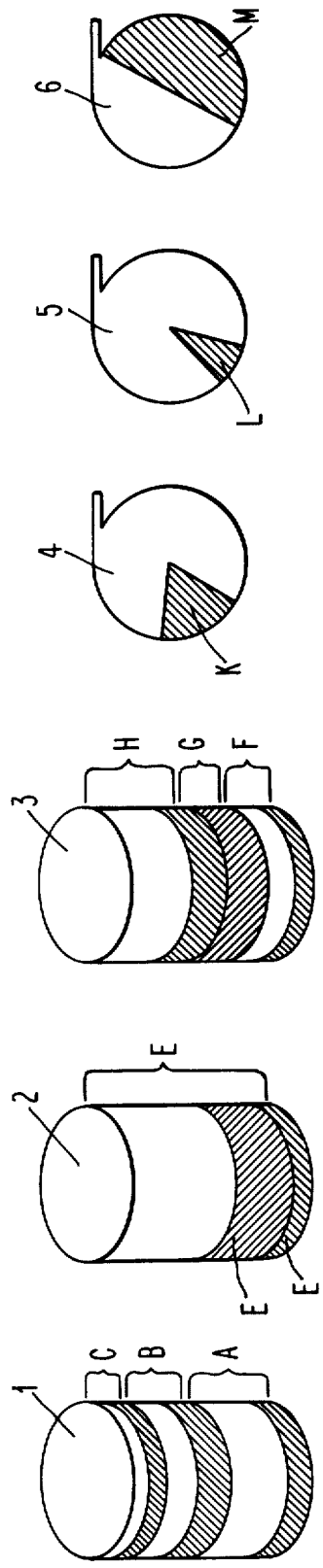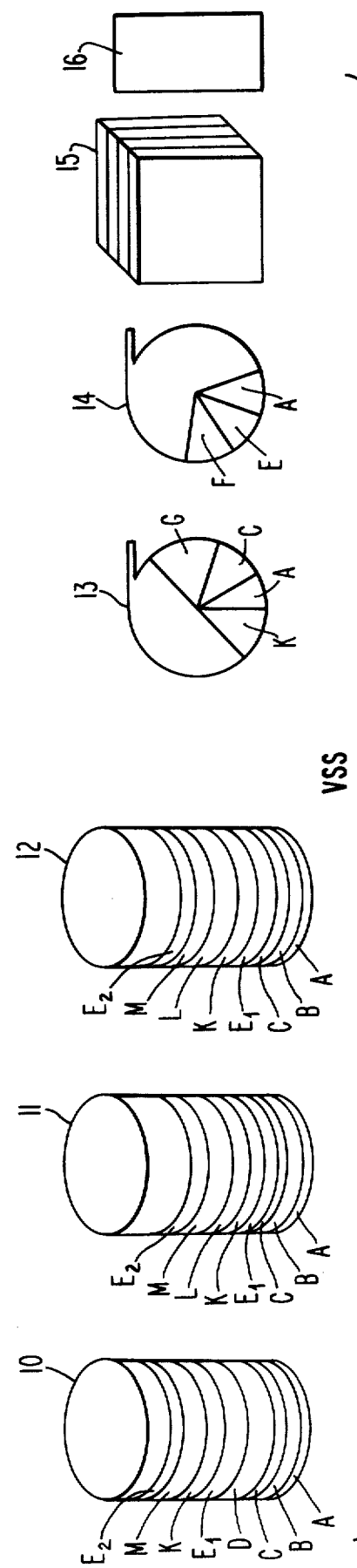
*Fig. 1* PRIOR ART
*Fig. 2* VSS

TYPICAL DFG ATTRIBUTES:

DFG 1 = ALL VOLUMES SHADOW RECORDED
DFG 2 = MAXIMUM VOLUME SIZE 100 MBYTE
DFG 3 = MIGRATION THRESHOLDS 90% (UPPER)
AND 80% (LOWER)

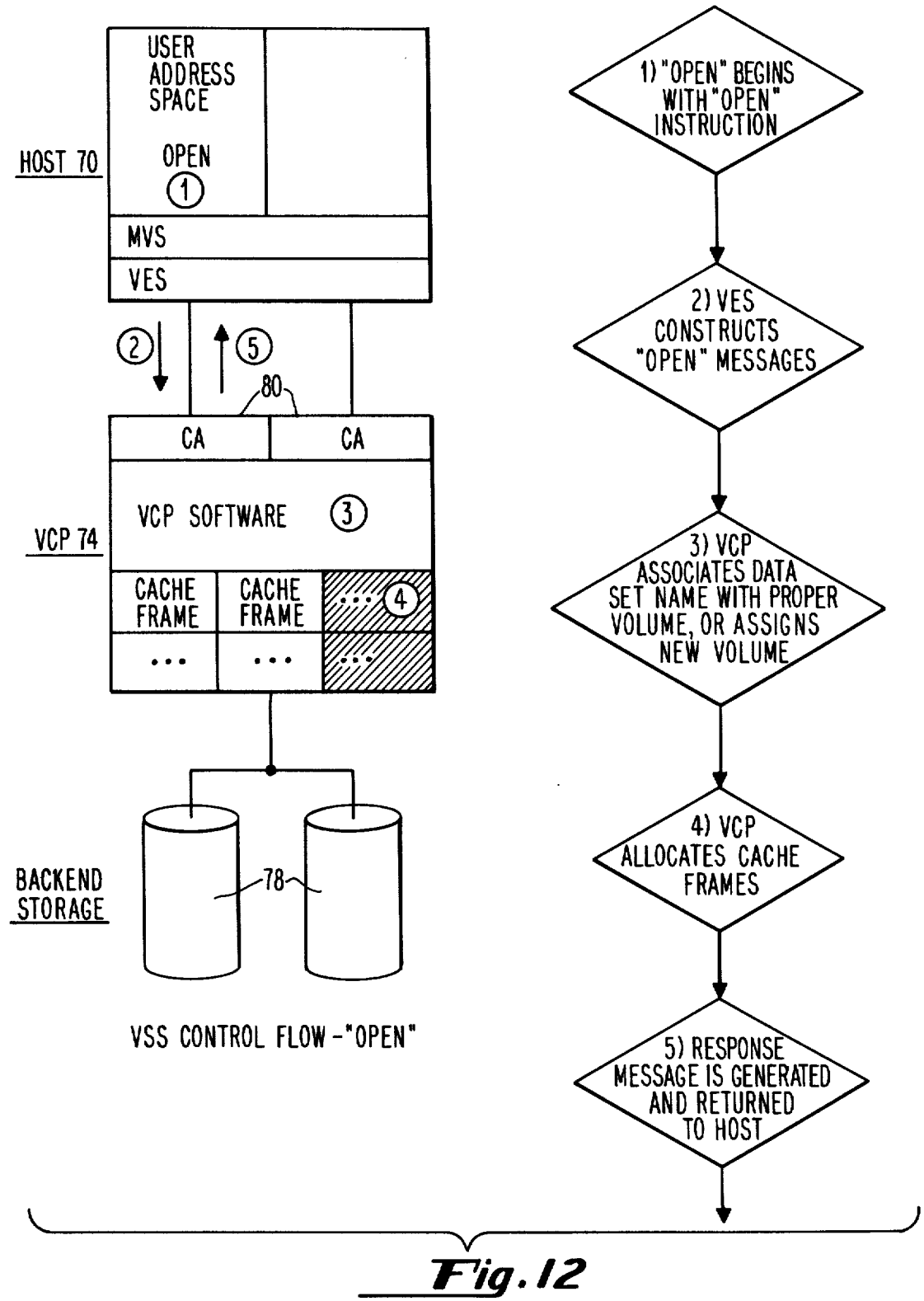

VIRTUAL STORAGE SYSTEM AND METHOD

This application is a continuation-in-part of Ser. No. 261,950, filed May 8, 1981, and of Ser. No. 085,909, filed Oct. 18, 1979, both in the name of Barry B. White.

FIELD OF THE INVENTION

This invention relates to the field of data processing and storage. More particularly, the invention relates to a data storage system adapted to be connected to a host digital computer for determination of where on associated magnetic memory units individual portions of user data sets are to be stored, and for recall of the addresses determined upon the host's requiring the data. In this way improved efficiency of storage is achieved while the host computer is largely relieved of the memory control function.

BACKGROUND OF THE INVENTION

In general, the operation of a data processing system involves two basic functions: arithmetic and logic operations performed on data contained within a host computer, and, stated broadly, input and output control. That is, the data to be processed must first be input to the computer, while the computer output typically results in further storage of the data together with results of the operation. While it is possible to perform such processing in a way that the data input is processed and the output is generated without long-term storage of either the data or of the results of the operation, it is far more common, particularly in large processing systems, that the data files operated upon are permanent files such as payroll files, employee files, customer lists and the like, which are updated periodically as well as being used to generate actual computer output such as payroll checks and the like. It is therefore important that means be provided for long-term storage of such data.

Various types of memory means for long-term storage of digital data have been provided in the prior art. These comprise magnetic tape memory, magnetic disk memory, magnetic drum memory, solid state random access memory, magnetic bubble memory, charge coupled device (CCD) memory as well as others. The choice of which sort of memory is to be used for a particular operation inevitably involves a cost/speed trade-off; that is, the faster the access time provided with respect to any given bit stored on a given type of magnetic memory, the more expensive it is to store the bit. There has developed in general a heirarchy of memory according to which the central processing unit (CPU) of the computer comprises solid state random access memory (RAM); an intermediate high speed "cache" or "virtual" memory used in conjunction with the host may comprise a less expensive, less high speed form of solid state RAM or CCD memory. The next step in the heirarchy may be a fixed head disk rotating magnetic memory external to the CPU of relatively lesser speed, but capable of storing a vastly greater quantity of data at significantly lower cost; further down the heirarchy are moving head, non-replaceable magnetic disks of high density, user-replaceable disks of lower density and finally tape drives.

The prior art has been extensively concerned with improvement in methods of utilizing the various forms of memory so as to achieve higher efficiency of use of the various types of media available, to reduce costs, and simultaneously to devise methods whereby the various time limitations of the less expensive memory means can be overcome, thus also improving efficiency. However, as yet no ultimately satisfactory solution has appeared.

It will be understood by those skilled in the art that control of access to a given tape or disk file has generally been accomplished by means of a command originating in the host central processing unit. In more basic systems, the user of the computer must inform the host of the addresses on storage media at which the data necessary to complete his job is stored. Upon initiation of the job, the host then passes the appropriate instructions on to the appropriate disk or tape controllers. In more advanced systems the user of the computer may need only specify the name of his data set; the host is capable of locating the file in which the data set is stored and, for example, instructing an operator to mount a particular reel of tape, or instructing a disk controller to access a given portion of a disk drive, as necessary. Some prior art systems provide memory and intelligence external to the host for relieving it of this command translation function—see, e.g., Millard et al U.S. Pat. No. 4,096,567. However, in both schemes, it is the host which is responsible for causing the controller to access the appropriate storage medium. The controller itself is passive and merely responds to the host's commands.

The present invention is an improvement on this practice which achieves better, more efficient use of the storage space available on disk media by functionally mimicing a tape drive. Inasmuch as a tape drive need only be addressed once at the beginning of each file and thereafter records can be written sequentially thereto without being interspersed with uniquely identifiable address marks (unlike disk-stored data), the amount of data stored within a given area of tape expressed as a percentage of the total area available is extremely high. By comparison, address marks must be provided for each record stored in a given sector of each disk of a magnetic disk storage unit; the address marks consume a large proportion of the space allotted. Moreover, it had been the prior practice to allot a particular portion or "file" of a given disk unit to a given data set and not to use this area of that disk for any other data set thereafter. Unless by coincidence the capacity of the file was, in fact, equal to the size of the data set allotted to it, which is usually not the case, as users tend to expect data sets to grow and therefore set up unnecessarily large files, space is wasted. The net result is that on average disks tend to be used to something less than 50% of their capacity.

In accordance with the first embodiment of the invention, a virtual storage system is interposed between a host CPU and disk drives. The virtual storage system comprises an intelligent processor which can itself make decisions as to where on the associated disk drives data could be stored. The virtual storage system responds to commands nominally issued to tape drives by the host and converts these to commands useful for control of disk drives. In this way, the virtual storage system allows disks to functionally mimic tape in order to achieve the efficiency of addressing and formatting considerations mentioned above. The original invention thus includes the concept of a memory system external to a host CPU having intelligence for determining where on associated disk drives portions of a given data set are to be stored, (as distinguished from merely converting a data set name to host-assigned addresses, as in the Millard et al patent referred to above) and further comprises the concept of individually allotting space on disks to individual subportions of a given user data set. In this way the prior art practice of allotting a portion of a disk, a "file", to a single data set, is eliminated and the disk can accordingly be used to far higher efficiency.

In an improved embodiment, data compression and decompression means are included in the virtual storage system of the invention. Data compression is a concept which had been well known for use in host CPU's but had not previously been done external to the host. This distinction is subsumed under the fact that this was the first system external to a host to provide intelligent processor means for control of data storage functions.

In accordance with the improved embodiment of the present invention, the virtual storage system is not simply interposed between a host computer and disk drives. Instead, the virtual storage system of the present invention operates in conjunction with modifications to the operating system of the host computer. Typically this will involve some reprogramming of the host. Furthermore, the virtual storage system according to the present invention is not constrained to cause disk drives to functionally mimic tape drives or other defined storage devices, as in the first embodiment of the invention, but instead presents to the host the image of a tabula rasa; i.e., a blank sheet upon which the host, and thus the user, can write without constraint as to the format or disposal of the data. In a preferred embodiment, the virtual storage system of the invention "supports" (i.e., is adapted to store) only sequential data sets, such as those which might conventionally be stored on tape, but the invention is not so limited.

Another source of inefficiency in data storage operations is caused by the way in which systems operate according to IBM-defined protocols. For example, when a given user program causes a user file to be accessed, the host first calls for the tape or disk on which the file is stored to be mounted, if necessary. This operation can consume considerable time. The host then issues a SEEK command, causing the read/write head of a disk drive, for example, to be juxtaposed to a particular area on a disk. Thereafter, the host issues a "READ" command directed to a portion of the file. Neither the SEEK, the READ, nor the mount commands indicate whether the request is for a portion or all of a file. In the case of a sequential file, for example, there might be literally dozens of READ requests directed to varied portions of the same file. Each time there would be some delay involved in supplying the host with the subportion of the file it sought. On disk, for example, there is an access time delay caused by the time required for the particular portion of the disk sought for to rotate until it is juxtaposed to the read/write head, as well as in most cases a "latency" time required for the head to move in or out radially with respect to the disk to reach the particular track sought. In the case of tape, even if the correct record is exposed to the head, the tape drive must still be brought up to its proper speed with respect to the read/write head before a read operation can be performed.

In order to reduce these access time delays, numerous prior art systems have been suggested in which the data either following or in the vicinity of a particular subportion of a file called for by a host is read into a faster access, semi-conductor memory, referred to as a "cache", in anticipation of later host READ requests directed at the same user data set. Such solid-state or semi-conductor memory systems offer substantially instantaneous access to any given bit stored thereon, but only at high storage cost per bit, so that they are unsuited for long-term storage of data infrequently accessed. Several such systems are disclosed in the prior art. The difficulty with these systems is that as noted they are not provided by the host with any indication whether a particular READ request is of one of a series or not, so that "caching" of data in the vicinity of all data sought can produce a performance loss if, in fact, a significant percentage of the requests are not for portions of sequential data sets. Commonly assigned copending application Ser. No. 325,346 filed Nov. 27, 1981 in the name of P. David Dodd, relates to such a caching memory subsystem, but according to that invention means are provided whereby the memory subsystem itself is enabled to distinguish between sequential and random requests, so that only those requests which are determined to be sequential cause caching of other data. This results in a substantial performance advantage. The necessity that the Dodd system be able to distinguish between sequential and randomly accessed files is necessitated by the fact that, as noted above, no distinction is provided between sequential and random data sets, according to standard IBM protocol. It would, of course, be possible to modify the host to provide such an indication, but for the purposes of the Dodd application, this was deemed undesirable; "plug compatability" was an extremely important object of the invention.

However, according to the present invention, limited reprogramming of the host is performed. In a preferred embodiment, therefore, the virtual storage system of the present invention supports only sequential data sets, including, for example, those which might previously have been stored on tape. As in the case of the prior art caching subsystems referred to above, subportions of data sets once having been accessed by a host computer can then be cached in semi-conductor memory to provide much faster access times. The caching system of the Dodd invention, as it has no information describing the data set being accessed, in particular, whether it is sequential or not, must look at each READ request to see if it is likely to be one of a series of requests for sequentially stored data on disk. Hence, it is limited to prestaging portions of a data set stored together, in one area of a disk; any shifting to a different area on disk causes it to conclude that a particular request is not one of a series, and therefore no staging is performed. According to the present invention, only data sets known to be sequential are supported; therefore this question does not arise. According to the present invention, because the virtual tape memory system of the invention knows the locations of all the subportions of the entire record, it can continue to prestage subsequent records to the cache even though they come from varying areas on disk. Furthermore, of course, the Dodd invention does not include any means for assigning storage locations on disk to data, but only responds to conventional READ requests from the host, which include this addressing information; the memory subsystem of the present invention assigns storage locations to the various subportions of each data set.

Other systems using solid-state memory external to a host computer to reduce access times are known as well. IBM Corporation has recently announced its Models 3880-11 and -13 disk control units, which combine solid-state memory with disk memory to reduce access times. The assignee of the present invention markets a Model 4305 solid state disk, which uses solid-state memory in a system which mimics a disk drive. Neither of these systems provide intelligence external to the host computer for assigning storage locations on magnetic media to subportions of a user data set as does the system of the invention; they merely respond to host commands. Reference to these systems herein should not be deemed to imply that they are prior art against the present application.

OBJECTS OF THE INVENTION

Accordingly, it is an object of the invention to provide an improved data processing and storage system.

A further object of the invention is to provide a data processing and storage system in which decisions as to the location for storage of data are made external to the arithmetic and logic unit, in a data storage subsystem having intelligence.

An important object of the invention is to provide a memory subsystem having intelligence and memory external to the host computer, whereby host requests can be anticipated and data can be cached from a lower speed magnetic memory to a high speed semi-conductor memory in advance of a host request.

A further object of the invention is to provide a memory system having decision making capacity with respect to storage locations for data, which additionally comprises means for dividing user-defined data sets into sub-blocks of data for storage in available locations on memory means.

A further object of the invention is to provide methods and means for more efficient data storage.

Yet a further object of the invention is to provide a memory storage system in which the allocation of storage locations to given data is made external to a host computer, in the memory system itself, whereby data compression and decompression can be performed upon the data stored in the memory system.

Still a further object of the invention is to provide a memory system for use in conjunction with a host digital computer in which duplication of data for purposes of reliability is performed by the memory system in accordance with usage, exclusive of the control of the host computer.

A final object of the invention is to provide methods for more efficient use of data storage apparatus.

Other aspects and objects of the invention will appear to those skilled in the art.

SUMMARY OF THE INVENTION

The invention fulfills the above mentioned needs of the art and objects of the invention by its provision of a virtual storage system which comprises a processor for allocating spaces on data storage means to blocks of sequential data supplied by a host computer. The processor, after having allocated addresses on, e.g., disk memory means to the data, the user data set being divided into subportions by the controller, if necessary, causes the data to flow from a temporary storage means, termed a "cache", through disk interface means and onto the disks. The cache comprises a high speed, relatively low capacity semi-conductor memory. The disk addresses are then stored by, for example, user data set name in an "address memory". When the host later calls for the same data set, the virtual storage system's controller refers to the address memory and determines where on the various disks the data set is stored. The data can then be transmitted back to the host via the cache for further processing. When a host calls for a portion of a data set, the remainder of the data set is "staged" to the high speed semi-conductor cache memory in anticipation of future requests, which can then be satisfied directly and at high speed from the cache.

In this way no space on any given disk is explicitly or permanently assigned to any given user data set. Instead, space on disk is taken up only as needed. The controller, using the address memory, "knows" at all times what areas of the disks are available for further storage. Similarly, it "knows" which data stored on the disks has been recently operated upon and therefore can be used to control efficient duplication of data to other memory means for "backup", i.e., for use in case of loss of the main data set on a primary memory means. In addition to the controller, in a preferred embodiment the virtual storage system of the invention comprises at least one channel adapter for connecting the host computer to the cache and which may additionally comprise data compression and decompression means so as to achieve further efficiency of storage.

BRIEF DESCRIPTION OF THE DRAWINGS

The invention will be better understood if reference is made to the accompanying drawings in which:

FIG. 1 shows the prior art method of storing data on magnetic disks and on magnetic tapes;

FIG. 2 shows the comparable method according to the invention;

FIG. 12 shows the flow of control signals through the virtual storage system of the invention;

DESCRIPTION OF THE PREFERRED EMBODIMENTS

Figure 3:
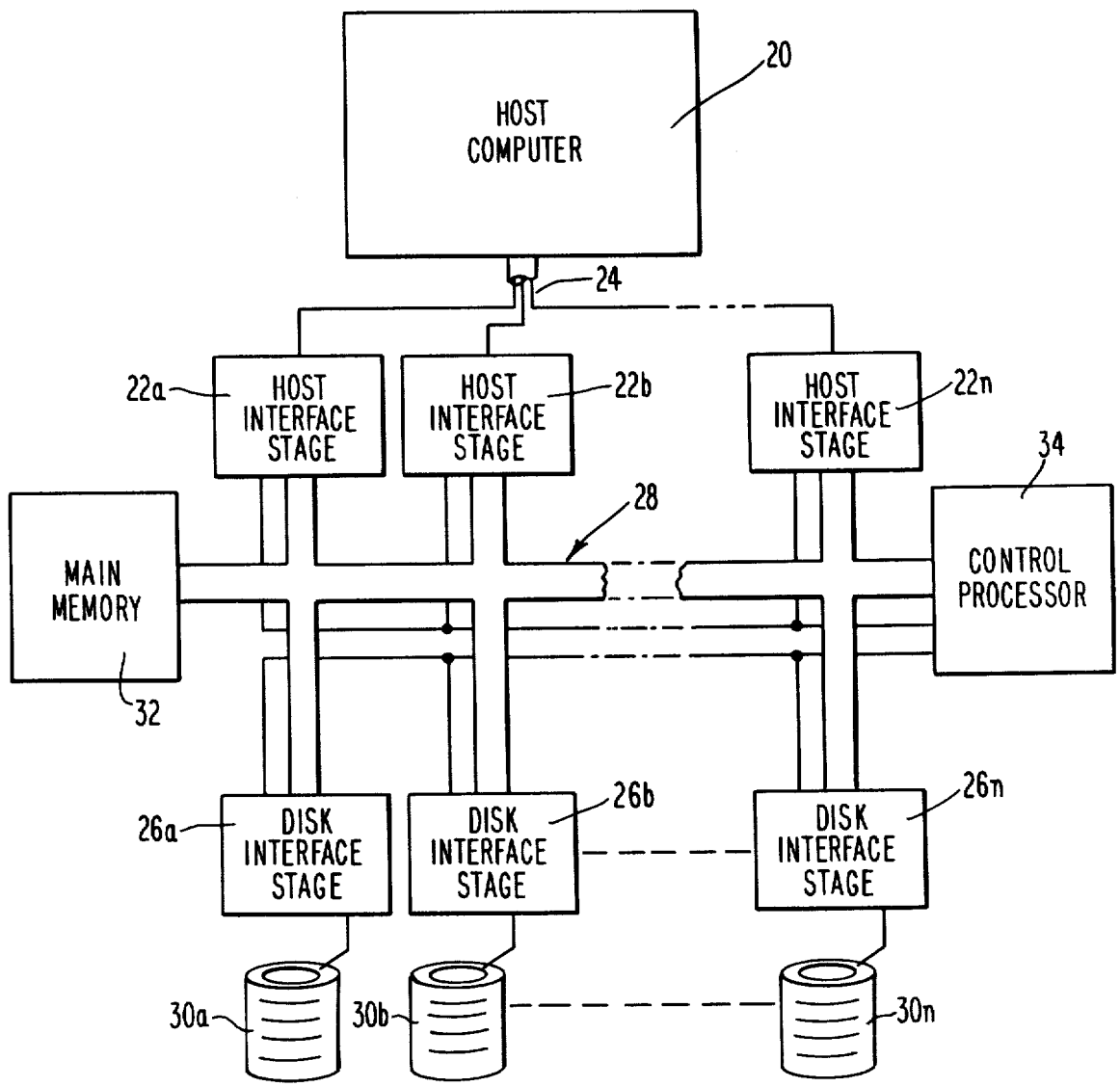
FIG. 3 shows a schematic diagram of the invention as originally conceived.

As discussed above, the prior art practice when storing a particular data set on, for example, a disk drive was to allocate a portion of this drive, a "file", permanently to that data set and to write into that space as needed. As data sets frequently grow in size over time, the practice would ordinarily be to allocate a large enough file size on disk that it would not be filled up for some time thereafter despite continuing use. The usual result is that the file space allocated to the particular data set is not filled thereby and accordingly the disk is not used to full efficiency. This practice is shown schematically in FIG. 1 in which a plurality of disk drives are shown schematically at 1, 2 and 3. The three disks 1-3 are shown divided into allocated files as at A, B, C, . . . H, for example, drive 2 is allotted to a data set denoted as E. In each, the area shown cross-hatched is that which might be occupied by data. The remaining region is therefore unused. File E is shown as comprising two areas $E_1$, $E_2$. This is meant to indicate that the data set might grow from $E_1$ to $E_2$ over a period of, say, several months and that in accordance with the prior art practice, the later added material $E_2$ would be added to the same file area on the same disk drive 2 as $E_1$ previously written thereto. The file E thus would have been largely wasted previously.

An additional prior art practice was to store more frequently used data on disk and some less frequently used data on tape, inasmuch as the access time of tape is typically greater than that for disk while the cost of tape storage is less than that of disk. An additional use of tape is to "backup" the disk drive; that is, to have the same data recorded both to disk and also to tape so that in the event of damage to the disk or the like the data would be preserved on the tape and the information not lost. Accordingly three tape files are shown as at K, L and M on tape files 4, 5 and 6, schematically showing this practice. It will be noted that a single data set is shown as resident on each reel of tape. This is a typical prior art practice, as it is generally deemed simpler to fetch a reel of tape from storage when a new data set is sought than to unwind another tape through a first data set in order to reach a second one. This, of course, leads to substantial underutilization of the total tape available.

Thus, in the prior art, when the host seeks access to one of the previously assigned user data sets shown in FIG. 1, typically the host will convert the user's request for a named data set into a command to a disk controller to read a part of the contents of the disk, through the host interface comprised in the disk controller, and on to the host. Thus the host is required to know where and on what type of memory means the particular data set sought for is stored. Where, for example, the sought-for data set is stored in a file on a demountable disk or on a tape, the host is required to convert the operator's command into a "mount disk" or "mount tape" instruction, typically appearing on an operator console screen, and the operator is then required to fetch the disk or tape called for from an archive. This practice while workable is time consuming and cuts down on the effective computing capacity of the host computer.

FIG. 2 shows in comparison the method by which data sets are stored according to the present invention. Instead of allocating specific file areas of specific disks to specific user data sets, space on disk or tape is assigned only as needed as the data arrives in the virtual storage system of the invention for storage. By allocating storage space only as required, additional area is made available for the storage of data. Moreover, the spaces assigned to a given data set are not necessarily, or even desirably, on the same disk or tape drive, but instead may be spread over several so that the average utilization of each is more or less equal. The fact that it is the external memory system and not the host which decides where and on what sort of storage media given data is to be stored provides considerable additional versatility in operation as well as improved host utilization and simplification of user programming requirements.

Thus in FIG. 2 the virtual storage system of the invention is shown comprising a plurality of disk drives 10, 11 and 12, each of which has given portions of various data sets disposed thereon. It will be noted that records $E_1$ and $E_2$ which might be in fact different portions of the same user data set are not together on the disk drives 10 through 12. Tape drives 13 and 14 are additionally provided. These may be used for back-up of data, duplicated for use in case of loss of the data on the disk, or may simply be data stored in files which have been inactive for longer than a given minimum period and has therefore been copied to the slower access but far less expensive tape drive media. Also shown is a semi-conductor cache memory 15 which is used to hold data files output by the host so that the host can output data without, e.g., waiting for the read/write head of the disk drive to be juxtaposed to the proper point on a disk, and for containing data files staged to the cache 15 in anticipation of further host requests. Finally, the virtual storage system comprises a further memory 16, also solid state, which is an address memory store for use in recalling the locations on disk and/or tape at which the subportions of a given data set are stored. Upon the host's calling for a specific data set, the address memory store 16 is accessed and caused by the processor to write the data from the disk or tape drive to the host. The address memory store 16 may desirably be a RAM (random access memory) of comparatively limited capacity. The high speed cache memory 15 will typically be another RAM of relatively larger capacity for use in assembling all of a sub-portion of a given data set prior to transmission to the host, so that the host need not receive the data set piecemeal from the virtual storage system according to the invention. Use of the cache also eliminates mechanical delays, such as the latency time inherent in performance of second and subsequent disk access operations, and permits high speed data transfers from the cache to the host.

FIG. 3 shows in simplified form the basic architecture of a first embodiment of the virtual storage system of the invention as originally conceived. The system of the invention is coupled to a host computer 20, and constitutes means for controlling one or more extremely fast and accessible disk memory unit(s) $30a$ . . . $30n$ to accept data and respond in precisely the same fashion as a tape drive, while providing much better use of available storage, thus in effect having vastly expanded storage capability and a far more rapid response time than either tape or disks. The host computer 20 may be of any appropriate type, although it is anticipated that economical operation of the present invention will dictate its use with a large mainframe host computer such as IBM System/360, System/370 computers, and IBM Models 3031, 3032 and 3033 processor complexes. The virtual storage system of the invention can also be used with a plurality of host computers. The storage system comprises a bank of host interface stages $22a$ through $22n$, the number of interface stages being dependent upon the amount of data to be transferred. Since the host interface stages are identical, the actual number which is to be used is for present purposes immaterial. The host interface stages are coupled to the host computer 20 by means of conventional channels 24 to receive and transmit information to the computer 20 in the ordinary, serialized format which is associated with tape drives.

One or more disk interface stages 26a through 26n are provided, and are coupled to all of the host interface stages by means of a common information bus 28. In this manner, information may be transferred between any given host interface stage and any disk interface stage.

The disk interface stages 26a . . . 26n are each coupled to respective ones of disk memories 30a through 30n. As will be discussed in further detail, each disk interface stage comprises a memory interface, a data buffer, and a disk interface, along with a local microprocessor controller for operating the various elements of the interface stage.

Also connected to the main bus 28 is a main memory 32. Memory 32 forms a repository for information flowing from the host interface stages 22a . . . 22n to the disk interface stages 26a . . . 26n, and may further serve as a memory for control processor 34 also coupled to the main bus 28. The control processor 34, which is the central processing unit or CPU of the virtual storage system, is coupled to each of the host and disk interface stages 22 and 26 respectively, and directs the operation thereof so that information may be received, queued, organized, and stored in the proper manner. The control processor 34 further instructs the various host interface stages 22 to cause them to respond to the host computer 20 in a manner which simulates a tape drive.

Figure 4:
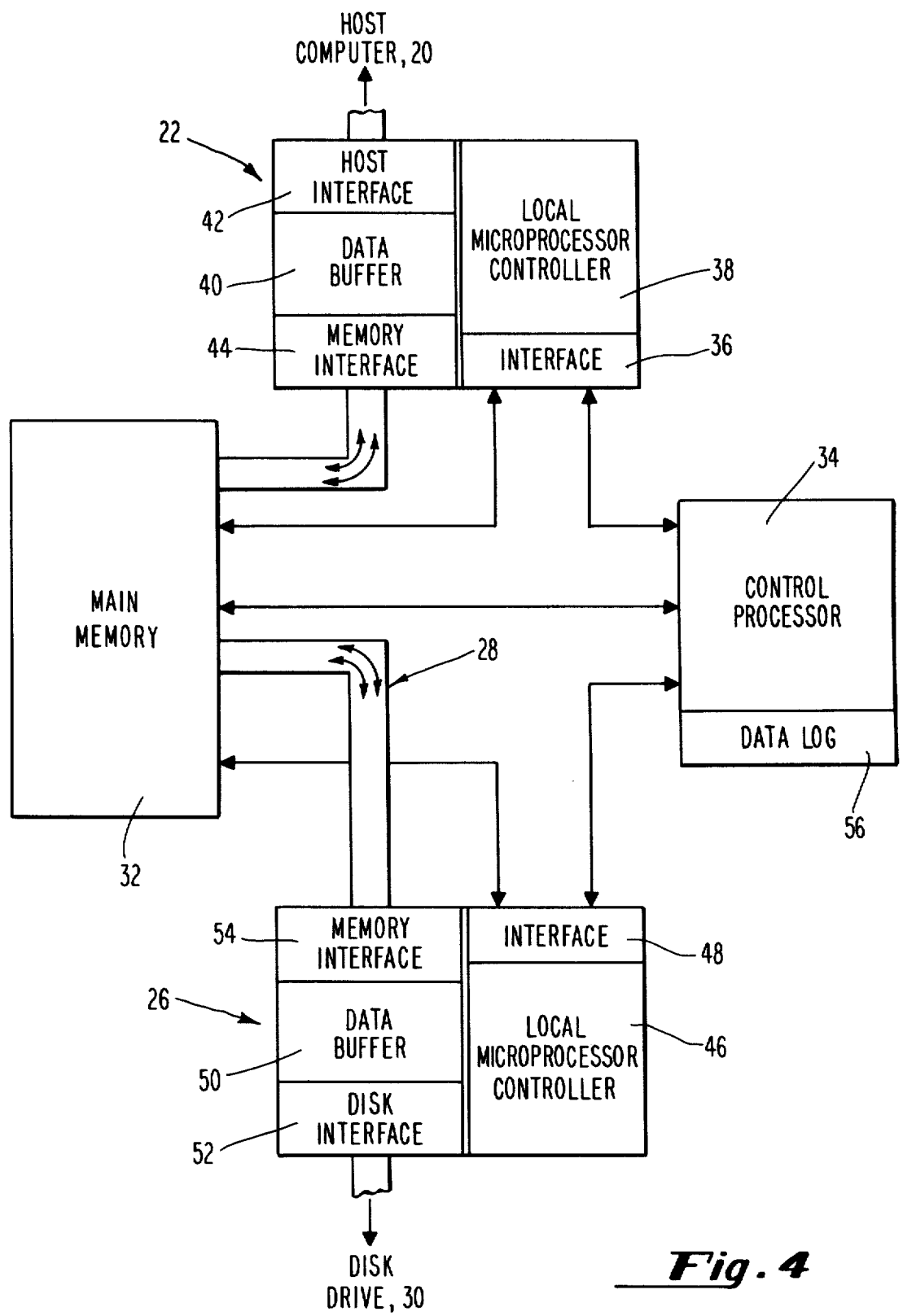
FIG. 4 shows a more detailed schematic diagram of the originally envisioned embodiment of the invention.

Turning now to FIG. 4, there is shown in further detail the structure of exemplary elements of the system. Processor 34 is coupled directly to host interface stage 22, and in particular to an internal interface 36 which simply facilitates the transfer of signals between the control processor 34 and a microprocessor 38 which forms the controller for the host interface stage. Also comprising the host interface stage are a data buffer 40, a host interface 42 which makes the data buffer compatible with the host computer 20, and a memory interface 44 through which the data buffer communicates to data bus 28.

The function of the host interface stage 22 is to simulate a tape drive system to the host computer; that is, to convert the host computer 20's commands to tape drives into commands to the virtual storage system of the invention, and to send the host 20 data in the form it would be sent by a tape drive. More particularly, host interface stage 22 accepts the signals from a host computer 20 which are of the type used to operate the tape drives. Such signals are obtained by coupling the host interface stage to the byte multiplex, or block multiplex, or selector channels of the host 20. It will be appreciated that these signals include operator commands such as "mount tape" and "demount tape" as well as machine commands such as "read", "write", and "forward space file". The host interface stage responds to both kinds of signals as if it were an operator and a tape drive, acknowledging the signals, responding that "mounting" of an imaginary (virtual) tape reel has been accomplished, and the like.

The data buffer 40 of each host interface stage accepts data from the host computer 20 in serial form, usually nine bits in parallel, in the precise manner that it would be reapplied to a tape system for writing upon a tape. The buffer 40 in conjunction with the host interface 42 during a write operation deserializes the information; that is, stores it in parallel fields holding the individual bits until eight entire bytes are available. Typically 72 bits are transmitted at a time thus reducing transmission time. In this manner, up to 90% compression of the time required to transmit the data on the line 28 can be achieved. When data is to be exchanged between buffer 40 and the bus 28, the data flows through memory interface 44, again in eight parallel bytes so that an extremely rapid exchange of data may take place. The size of said buffer can vary greatly, depending on system requirements but in a preferred embodiment is large enough, 64,000 bytes, to hold an entire record, which expedites time sharing of bus 28.

Ultimately, data received from the host computer 20 is written onto magnetic disks mounted on one or more disk drive units 30a to 30n. Disk interface stage 26 couples data bus 28 to a disk drive 30 (not shown), and is comprised of a local microprocessor controller 46 which operates the various elements of the interface stage in accordance with instructions from control processor 34. As was the case with the host interface stages 22, with disk interface stages 26 instructions from the control processor are transmitted through an interface 48 to the local controller 46. The latter then responds by causing a data buffer 50, disk interface 52, and memory interface 54 to transfer data to and from the disk drive.

In particular, memory interface 54 serves to receive eight bytes of data from bus 28 and serialize the data so that it is installed in buffer 50 in a single stream of bits. Arrangement and queueing of buffer storage is accomplished by the local controller 46, as is the operation of the disk interface 52 which passes data from buffer 50 to the disk drive at the appropriate times. Still further, the disk interface stages serve to seek and log the locations of data upon the various disks of the disk drive associated therewith, so that the information can be retrieved when needed.

Between the time data is in a host interface 22 and is received in a disk interface 26, it is stored in a main memory 32. The high speed main memory 32 thus acts as a "bank" or "cache" which holds the data until one of the disk drive units 30 is ready to accept it. When this occurs, the disk interface stage 52 associated with the disk drive 30 signals control processor 34 of its availability. The control processor 34 then instructs the main memory or cache 32 to discharge data to the disk interface stage 52 by way of bus 28.

In like manner, when the host computer 20 is seeking data, the identity of the data sought is transferred through host interface stage 22 to the control processor 34, which then determines if the requested data has been previously moved into the main memory 32. If it has not, the control processor 34 in turn will apply a "transmitter" signal to the disk interface stage 26, and the local controller 46 therein will cause data to be read out of the associated buffer 50, through the associated memory interface 54, and onto the data bus 28, and thence to the main memory 32. At the same time, the local controller 38 of the available host interface stage 22 will enable the associated memory interface 44, so that the newly-read data will be received from main memory 32 and gated into the host interface data buffer 40. By comparison, if the data sought was located in the main memory 32, the data will be immediately gated out of the buffer 40, serialized by the host interface module 42, and transmitted to the host computer 20.

In an alternative embodiment, both host buffers 40 and disk buffers 50 may be dispensed with, their functions then being performed by main memory 32.

In this fashion, segments of data which have been dispersed throughout a number of disk drives are compiled, queued, and then re-assembled automatically into serial form. Accordingly, the information flowing to the host computer 20 from the various disk drives 30 appears in serial form, precisely as if it were being read from a tape.

In the foregoing manner, the high speed main memory provides a cache from which data can be selected and queued for subsequent reassembly into serial form before being directed to the host computer.

As will be recognized by those skilled in the art upon learning the teachings of the present invention, the above described embodiment of the virtual storage system of the invention could be assembled from commercially-available elements, and coupled together in any convenient fashion. For example, the local microprocessor controllers 34 used for operating the components of each interface stage need only be of rather limited capability and may be comprised of any of the various high speed microprocessors available on the market. An example of such microprocessors is the LSI-11 marketed by DEC Incorporated of Boston, Mass.; alternatively, a suitable unit can be assembled from the AMD Co.'s 2900 series of parts. In like manner, the host and disk interfaces 22 and 26 which accomplish the serializing and deserializing of information may be standard units, such as the model 370 block multiplexor available from the IBM Corporation of Armonk, N.Y. In like manner, an IBM block multiplexor may be used for direct memory access, the actual connection of the various units being well understood by those skilled in the art.

Similarly, the buffers 20 and 30 used for temporary storage of data in the host and disk interface stages 22 and 26 may be of any appropriate type, although in a presently preferred embodiment a memory of at least 64K bytes is preferred. One commercially available buffer of this type is manufactured by Fairchild Semiconductor, and comprises a N-MOS random access memory having a speed of 200 nanoseconds.

The high speed memory 32, which serves as a data cache should be of the type generally designated a fast access memory, i.e., one having a cycle time of 400 nanoseconds or less. In a preferred embodiment, the high speed cache has a capacity of 16 megabytes. One commercially-available memory appropriate for use with the present invention is manufactured by Intersil Corp., Sunnyvale, Calif., and is marketed by Storage Technology Corp. of Louisville, Colo. assignee of the present application, and designated models 3758 and 3768.

The embodiment of the invention just described was, as noted, the first envisioned embodiment of the invention and was the subject of the copending application Serial No. 85,909, filed Oct. 18, 1979, of which the present application is a continuation-in-part. That system performed the function of dividing user data sets into subportions for storage, and assigned storage locations to the subportions, retaining the assignments for use later in reassembling the data set. However, the first embodiment of the invention, as it was designed to be plug-compatible with a tape drive, was limited to responding only to commands directed to tape drive units. In the presently preferred embodiment of the invention, this limitation is not present, and the virtual storage system of the invention can accept any data set output by the host.

Figure 5:
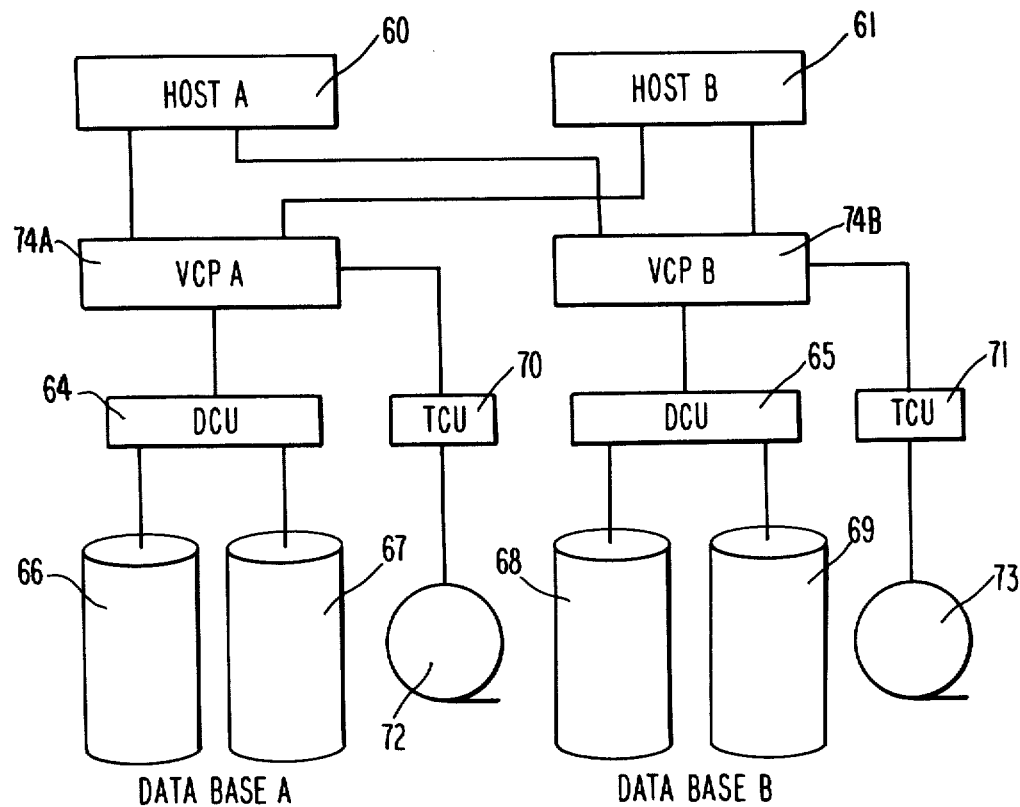
FIG. 5 shows an overall view of the presently-preferred embodiment of the virtual storage system of the invention as connected to host computers, plural disk drives and tape drives.

FIG. 5 shows the overall layout of a data processing and storage system utilizing the presently-preferred embodiment of the virtual storage system of the invention. The particular system shown in FIG. 3 shows a pair of host computers 60 and 61 each connected to a pair of virtual control processors (VCPs) 74A and 74B which amount to the heart of the virtual storage system of the invention. In the preferred embodiment the VCPs comprise Magnuson M80 computers, the main memories of which include both the cache and the address memory space in which is stored the "directory" which lists the locations on disk at which the various subportions of a user-defined sequential file are stored. The VCPs 74A and 74B are each in turn connected to a data base, which in the configuration shown each comprise a pair of disk controller units 64 and 65 each operating a pair of disk drives each 66 and 67, and 68 and 69, respectively, and to a pair of tape controllers 70 and 71 having attached thereto tape drives 72 and 73, respectively. The data bases may comprise additional disk and tape units, depending on the capacity of the VCPs 74A and 74B. The virtual control processors 74A or 74B may each also have secondary connections to the other's data base, for backup purposes. Accordingly when a host requests a specific user data set or "virtual volume" the request need only specify which of the two virtual control processors 74A or 74B controls the data base within which is stored that virtual volume. The virtual control processors 74A and 74B are each able, using their internal address store, to convert the name of the file into the location of the data on the disk or tape unit(s) involved and forward it to the host without further instruction from the host.

It is well known by those skilled in the art that there is at present available an IBM Corporation computer system which uses disk drives external to a host computer for expansion of the CPU memory space. This is operated according to a program contained in the host known as MVS which is an acronym for "UNS/M/ultiple UNS/V/irtual UNS/S/torage". The present invention similarly relates to what might be termed "virtual" storage, but is concerned with long-term storage, not expansion of the CPU storage.

Figure 6:
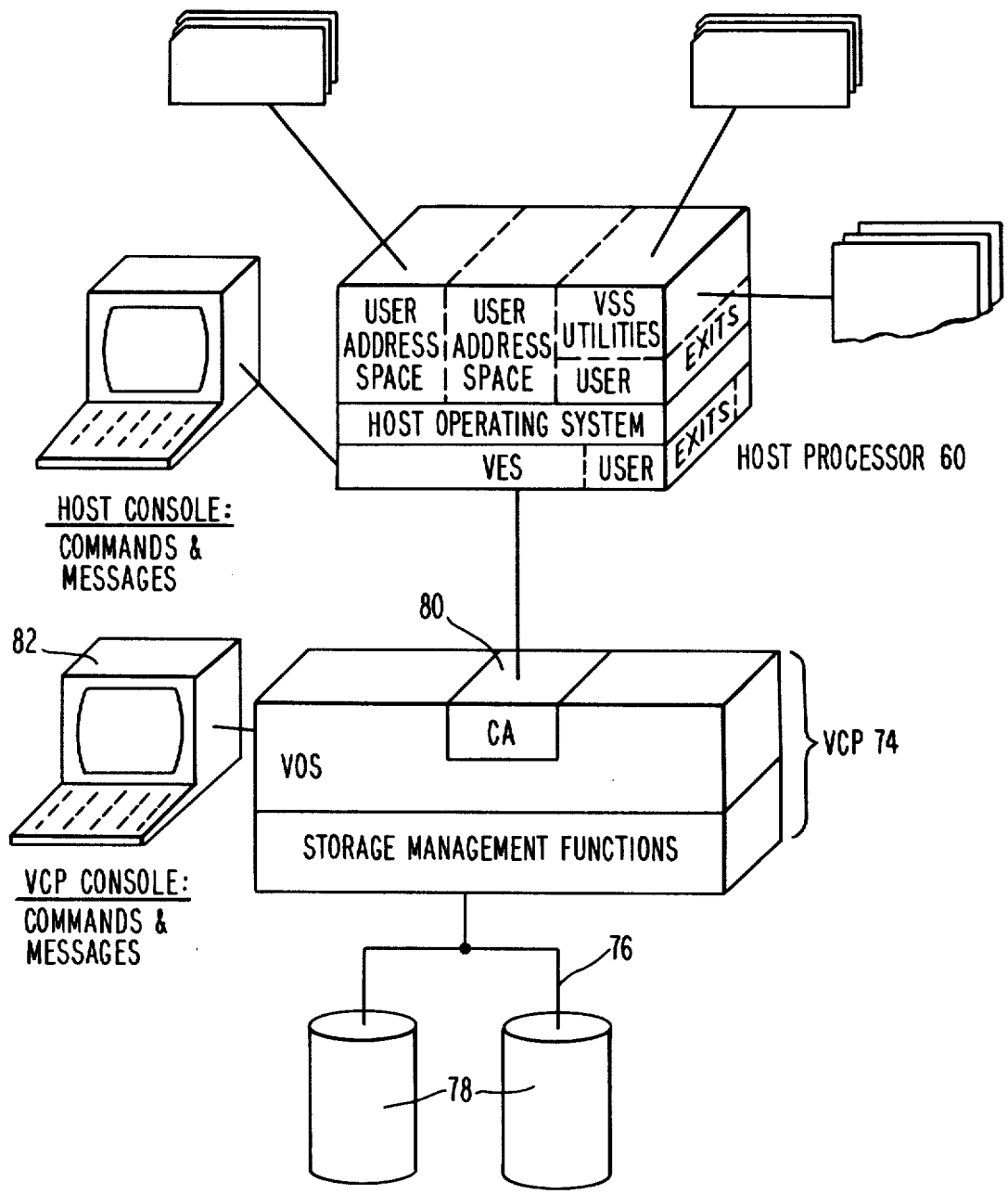
FIG. 6 shows a more detailed view of the virtual storage system of the invention as connected to a host computer.

FIG. 6 shows a schematic view of how a virtual storage system according to the invention could be operated in conjunction with an IBM 370/158 or 30XX CPU having this MVS feature. The invention in this preferred embodiment would also function correctly with any other host having MVS capability, such as the Amdahl V-8 host CPU. The host computer 60 contains software for various purposes denoted on the drawing such as user address space, means for accepting jobs from punch cards and orders from a console, and the like. Adaptation of such a host operating system to be useful with the virtual storage system of the invention requires some reprogramming of the host computer as will be discussed in further detail below. As noted above, it is desirable that only sequential data sets be supported by the virtual storage of the invention; MVS as supplied by IBM gives no indication of whether a given request is random, or is one of a series of requests from a sequential file. In essence, an additional program referred to as VES, or "UNS/V/irtual Storage System UNS/E/xecution UNS/S/ubsystem" is added, as is additional VSS host utility software to generate reports relating to the operation of the virtual storage system of the invention, to keep the user apprised of its status. The host 60 is connected by a bus to the virtual control processor 74 of the invention which in turn is connected via disk controllers (not shown) by additional buses 76 to one or more disk storage devices 78. The bus leading from the host 60 is connected to the virtual control processor 74 via a channel adapter (CA) unit 80 which will be discussed further below. Broadly, the channel adapter 80 connects the host channel (not shown) to the virtual control processor 74 and performs additional functions as will be discussed in further detail below. The actual operation of the virtual control processor is under the control of a UNS/V/ irtual Storage System UNS/O/ perating UNS/S/ ystem (VOS) which receives operator input via a VCP console 82; additional software is contained in the virtual control processor 74 for storage management and reporting functions as noted.

Figure 7:
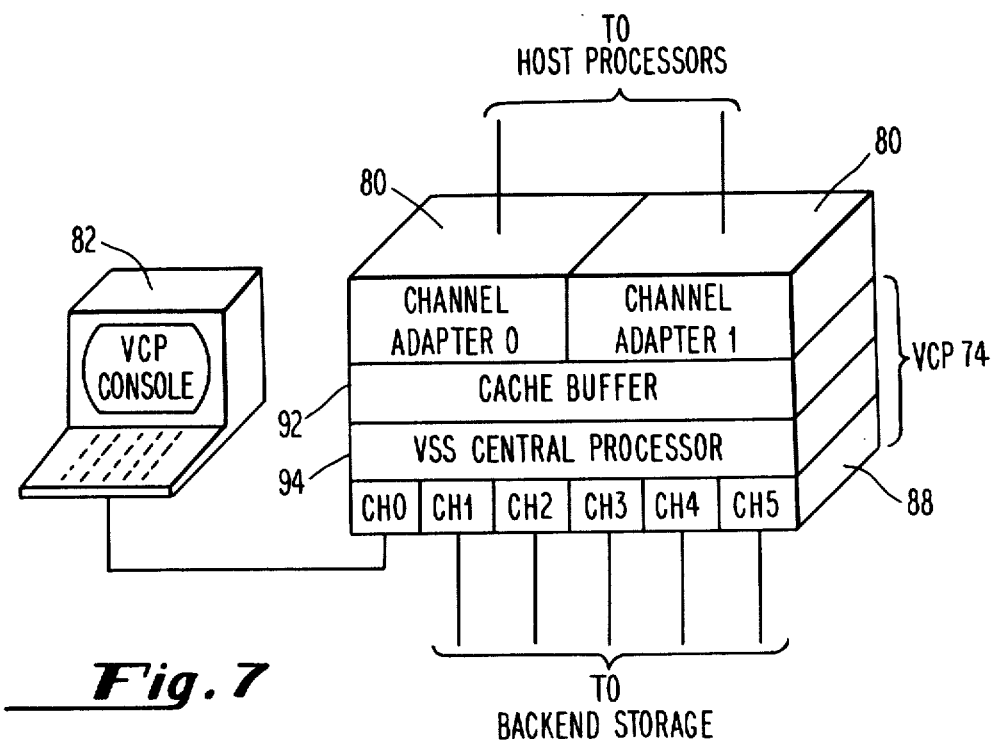
FIG. 7 shows the hardware comprising the control processor of the virtual storge system of the invention.

FIG. 7 shows the hardware comprising the virtual control processor (VCP) 74 in broad outline. As shown, the console 82 is connected to the VCP 74 through a conventional channel. Other conventional channels, numbered CH1-CH5 and indicated generally at 88, are used to interface with backend storage such as disk drives and tape drives. The VCP 74 is interfaced to one or more host processors through one or more channel adapters 80. The channel adapters 80 perform all required interfacing activities with the host 60. To the host the channel adapter 80 appears to be a storage device control unit which responds to channel protocol in a conventional manner. Each channel adapter 80 responds to two addresses in the preferred embodiment, one for data transfer and one for exchange of control information. During data transfer, the channel adapter 80 performs compression and decompression on user data. Details of the channel adapter 80 are to be found in co-pending application Ser. No. 261,950 filed May 8, 1981.

The VCP 74 additionally comprises a cache buffer memory 92. This may be conventional solid state random access memory (RAM). As noted in a preferred embodiment, the VCP 74 is the processor of a Magnuson M80 computer; in this embodiment, the cache buffer 92 is a portion of the Magnuson's main memory which is used to perform storage management functions on user data. Blocks of user formatted data are broken down into "pages" of convenient size for storage on the backend device chosen. For example, for use with a typical disk drive, the page would be equal to a fraction of one disk track. The cache is accordingly divided into a plurality of "frames" of e.g., 4 kilobyte capacity, into each of which one page can fit. When a frame is full with a page of data it is written to the appropriate backend storage device. A plurality of frames, e.g., a total of 4000 frames or 16 megabytes, may be provided in the cache so that simultaneously hosts can be reading and writing to the cache buffer and so that there need be no delay in host operations caused by the operation of the backend storage device chosen.

The final component of the VCP 74 is a processor 94 which, as noted, in a presently preferred embodiment may comprise a Magnuson M80 under the control of which the above operations are effected. This processor 94 comprises memory means for storing the addresses of available space on the backend storage devices used. Those addresses at which data is already stored are cross-referenced in this memory together with means for identifying the specific records stored at the addresses. In this way, when the host calls for a specific file the VSS central processor (VCP) 94 can consult this memory and determine where in backend storage the data is stored. If the particular storage medium is mounted on a disk or tape drive, the first page of data can then be read directly into the cache buffer 92. If, for example, the file called for is stored on a reel of tape not presently mounted, the processor can cause an operator instruction to appear on the VCP console 82 or on a host console, e.g., to mount the appropriate reel of tape, whereupon the data can be read into the cache 92 a page at a time for forwarding to the host. On the other hand, if the READ request is for a second or subsequent portion of a data set already accessed, the data can be supplied directly from the cache to the host, without delay.

It will be appreciated by those skilled in the art that the concept of using the controller 94, working in conjunction with the cache 92 to divide user formatted data which may be of any block size and of any total length into "pages" of size convenient for storage on predetermined backend storage devices, thus treating the allocation of storage space for each page separately, is new to the art. The host thus does not enter into the process of data management and control, to the extent that the virtual control processor even reformats the data. By comparison, the prior art practice required the user to define each file to be the maximum length envisioned for future use and to select the type and location of the magnetic storage medium on which the file was to be permanently kept. Not only is this practice inefficient in that almost inevitably the file would be made bigger than necessary, but it requires that the user (or, in more advanced systems, the host) make decisions as to the storage utilization. By comparison, according to the present invention, no storage space is wasted, as locations are only allocated as necessary. Furthermore, the virtual storage system of the invention divides each and every file into blocks of a size convenient for storage from the storage system's point of view, thus ensuring far higher efficiency of storage, without interfering with the user's configuration of his data set. The provision of an intelligent memory subsystem is essential to achieving this high efficiency, as the time required by a user to divide each data set into blocks of sizes fitting the available storage devices would be prohibitive. Thus, the fact that the storage location is assigned by the storage system relieves both user and host of this task. In certain embodiments of the present invention discussed below, even the choice of the type of magnetic storage medium on which a given data set is stored is made by the virtual storage system of the invention, based on usage history.

Figure 8:
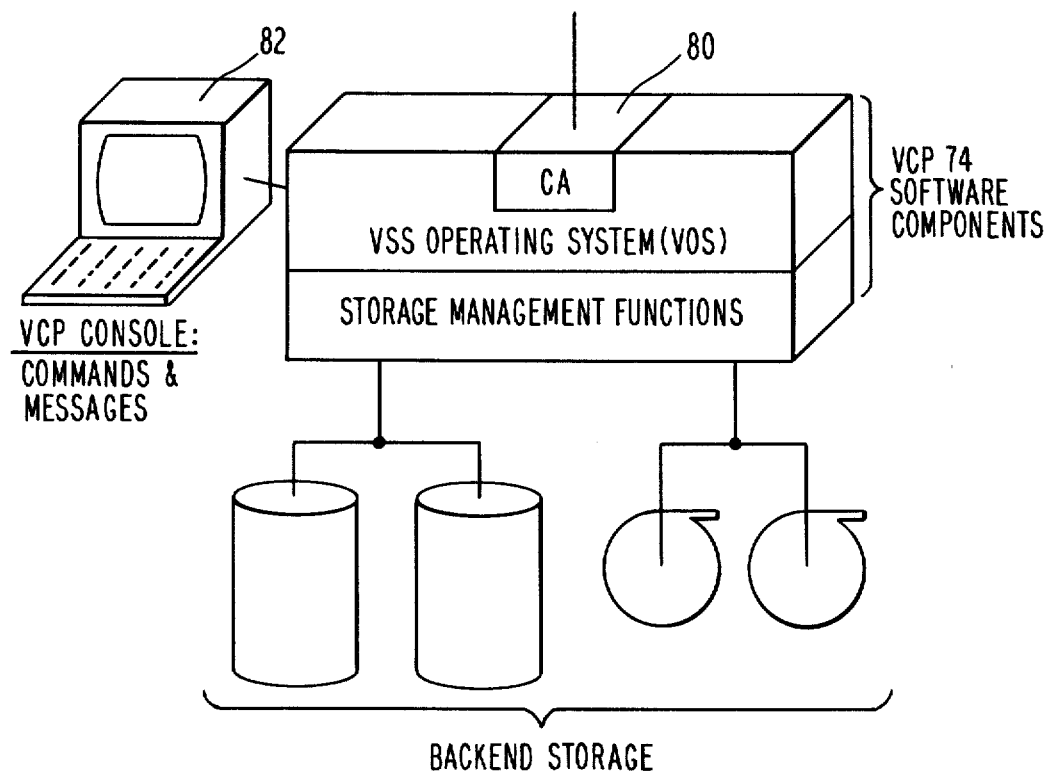
FIG. 8 shows a schematic view of the software components of the virtual storage system of the invention.

FIG. 8 shows a block diagram of the software comprised by the virtual storage system of the invention. Again, the VCP console 82 is shown as it has, of course, input to the operation of the system, as does the channel adapter 80. The VCP processor (94 in FIG. 7) operates according to the UNS/V/ SS UNS/O/ perating UNS/S/ ystem (VOS) and on functional software which performs storage management and backup/recovery functions. VOS performs typical operating system functions for the VCP processor 94, including I/O services, main storage allocation and console communication. Functional software performs the following storage management functions: control of host/VSS data flow; backend device management; disk drive space management; recovery management; and diagnostic/service report. Additionally, the functional software is used to control backup writing of records stored on disk to tape so as to free more disk space. Furthermore, the virtual storage system of the present invention comprises means for adaptively changing the class of device on which a given data set is stored if it turns out to be used more or less frequently than originally thought likely. It will be understood, of course, that these functions may be performed in interaction with the operator by means of the console 82.

Figure 9:
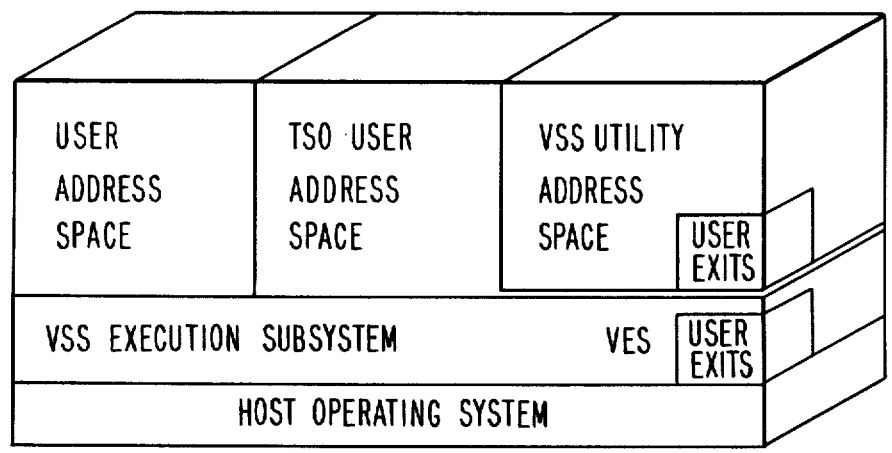
FIG. 9 shows the host resident components of the virtual storage system of the invention.

As discussed above, the utility of the virtual storage system (VSS) of the invention is maximized if certain judicious modifications are made to the operating system software of the host. In a preferred embodiment, the host must now distinguish between randomly and sequentially-accessed data sets and direct only sequential data sets to the virtual stoage system of the invention for storage. The modifications required to the IBM 370/158 MVS program are shown schematically in FIG. 9 and in greater detail below. Those skilled in the art will readily recognize the various components of the MVS program. The changes involve addition of the UNS/V/ SS UNS/E/ xecution UNS/S/ ub-system (VES) and the VSS utility function. The VSS Execution Sub-system, VES, is the VSS address space which functions as a secondary sub-system in the host MVS environment. VES provides an interface between user jobs running on the host and VSS itself. Major functions performed by VES include initialization of jobs, job management, data management, interface with the console and interface with the job control language cards used to detail a particular job to the host. In order to support VES, VSS maintains a number of table entries and queues in the common area of the MVS address space.

The host resident VSS utility functions provide system support and management personnel with the tools requisite to install, manage and maintain VSS. These functions provide reports on VSS status and performance and provide assistance in data and system recovery. Typically the utilities can include a report formatter to produce VSS formatted report output, user exits to interface with existing security and accounting systems and to monitor activity, transaction enable and disable capability, and means to permit control of VSS from the host computer console. Those skilled in the art will readily understand how MVS may be modified to yield these results.

Figure 10:
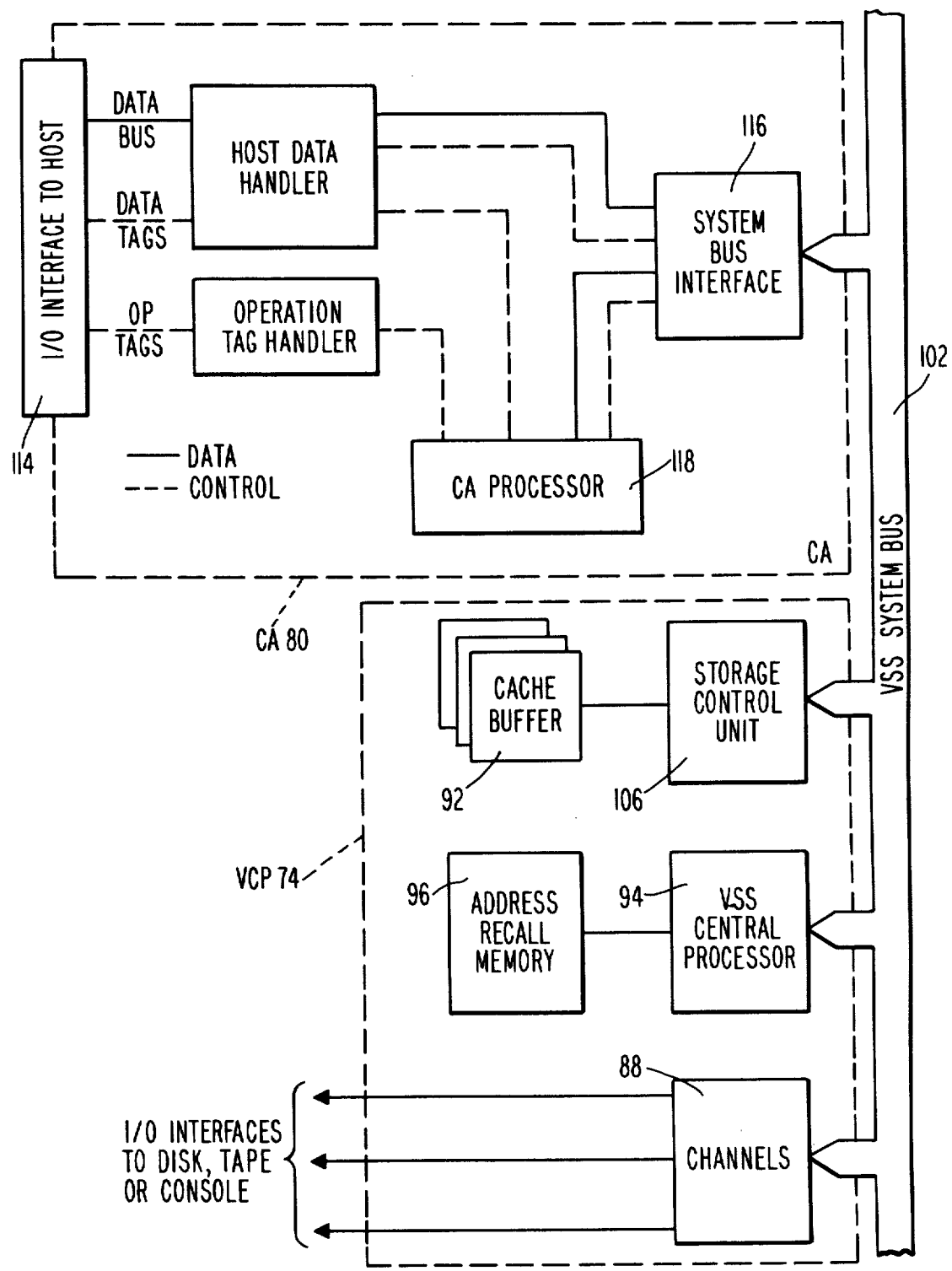
FIG. 10 shows a more detailed block diagram of the virtual storage system of the invention and the channel adapter which serves as the host interface unit.

FIG. 10 shows a more detailed block diagram of the virtual storage system of the invention. As noted, its chief components are the channel adapter 80 indicated by dotted outline, a system bus 102 and the virtual control processor (VCP) 74 also indicated by a dotted outline. As noted, in a preferred embodiment the virtual control processor 74 comprises what might in other circumstances be considered an independent computer itself; in a presently preferred embodiment, a Magnuson Co. model M80/40 is used. As noted above, this virtual control processor 74 contains a storage control unit 106 connected to a memory which forms a cache buffer 92 for temporary storage, or "cacheing", of data while assignment is being completed by the VSS central processor 94 and for staging of data in anticipation of a host request. Central processor 94 is connected to a memory 96 for recall of the addresses on backend disk and tape storage at which various portions of particular user files are stored. The system bus 102 connects the channel adapter 80, the cache 92 and the channels 88, over which data is written to disk or tape storage media as well known in the prior art, under the control of the processor 94.

The function of the channel adapter 80 is to connect the input/output interface 114, to which a host computer is connected, with the system bus interface 116. In the interim between the two, various operations may be performed on the data under the control of a channel adapter processor 118, which may chiefly comprise a microprocessor, such as a Zilog Co. Z8000 unit. In a presently preferred configuration as shown in FIG. 10 the channel adapter processor operates on operation tags and data in parallel.

Perhaps the most important single function performed in the channel adapter in a presently preferred embodiment is that of data compression upon writing and decompression upon reading of data to or from backend storage, respectively. It will be understood by those skilled in the art that data compression can in many cases significantly reduce the actual amount of data which is required to be stored thus yielding further storage efficiency. It will also be appreciated by those skilled in the art that data compression has been performed in the prior art but only in a host environment and not by an externally operated memory system having intelligence of its own. Data compression is performed prior to dividing the data into pages, to further maximize storage efficiency. Details of the preferred embodiment of the channel adapter as mentioned above are discussed in co-pending application Ser. No. 261,950 filed May 8, 1981, referred to above and incorporated herein by reference.

As noted above, in the prior art typical large data processing and storage systems (i.e., ones having the computing power of at least one IBM 370/158 class processor) would typically employ a complete heirarchy of storage devices. Large sequentially organized data sets would be stored on tape. Smaller and more active sequential data sets would be stored on disk thus allowing on-line availability. Moving the small and/or active data sets to disk offers the user the advantage of fewer tape drives required and improved system through-put. However, additional requirements for management of these disk resident data sets arise. Data set placement and backup for reliability and migration become critical and time-consuming tasks. The present invention addresses and solves these problems by automating routine storage management functions and by providing migration and backup capabilities which are independent of the host processor. The system of the invention thus provides on-line data availability comparable to permanently mounted direct access devices such as disk drives, the access time advantages of semiconductor storage by virtue of provision of a cache memory, relative cost savings by increased utilization of disk storage, and ease of use and control to the programer of a device independent data set.

This may be termed a "virtual storage system" (VSS) in that this language suggests a certain independence from physical constraints and limitation. As virtual storage operating systems (such as the IBM MVS system referred to above) freed programmers from the constraints imposed by relatively small areas of real CPU storage, VSS frees the user from the limitations imposed by storage device requirements. By automatically performing space management functions and storage allocation, VSS offers the user true storage device independence. In a presently preferred embodiment, these goals are achieved by storing the user data in units called virtual volumes. Each virtual volume contains one user data set and can be whatever size is necessary to contain that data set.

Those skilled in the art will recognize that in the prior art data sets were conventionally stored in files—preassigned portions of tape or disk media—of fixed storage capacity. A large data set might thus be stored on two tape drives. Conversely five different data sets might reside on a single disk. The virtual storage system of the invention minimizes storage management problems by introducing the concept of variable size "volumes". Once a user creates a variable volume for a particular data set, it may be expanded or contracted to whatever size is necessary to contain the actual data. The allocation of space on whatever storage device is chosen is performed automatically. Moreover, the virtual storage system central processor 94 maintains a table which keeps track of the volume activity and of the location of each of the portions of each volume.

Each volume is comprised of an integral number of "pages". From the user's viewpoint, each volume consists of a number of data blocks of whatever block size is convenient to the user. The virtual storage system of the invention assembles the data blocks into pages conveniently sized for its own purposes. In the presently preferred embodiment each page is equivalent in size to one disk track. Thus a virtual volume consists of a number of pages, each the size of a full track. The track-sized storage areas in various locations throughout disk storage in which the pages are stored are referred to as "frames" in both the cache and in the disk drive. The analogy may be made that the frame is the bucket and the page is the water. For each page of data that is transferred to on-line storage during a write operation a frame must be allocated both in cache and in disk storage. Plural frames are provided in the cache to allow simultaneous reading and writing.

Figure 11:
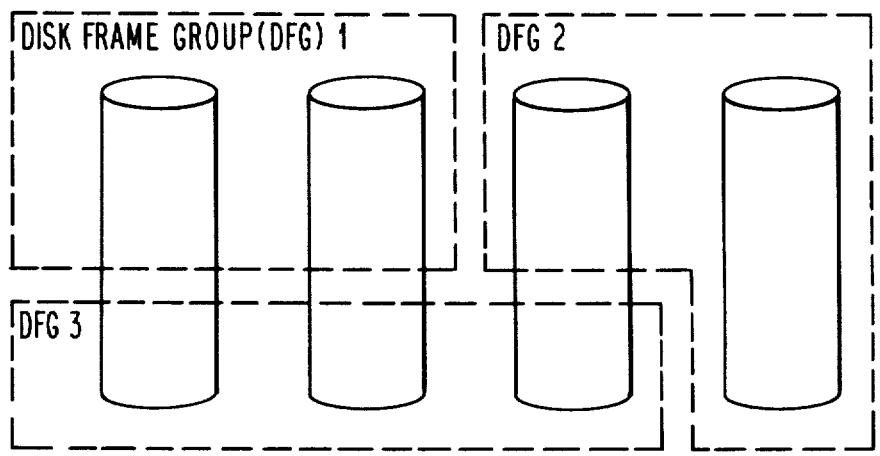
FIG. 11 shows how various data frame groups can be organized on a plurality of disks according to the user specifications.

A further subdivision of the storage system according to the presently preferred embodiment is shown in FIG. 11. There groups of disk frames are organized into "disk frame groups" for storage management purposes. Certain attributes of control can be assigned to each fram of a given group. Each virtual volume, i.e., each data set, will be allocated frames from only one disk frame group. This enables these attributes to be assigned to each virtual volume so as to readily perform the appropriate management functions provided by the storage system of the invention with respect to each user data set. For example, one might put a maximum size limit on each virtual volume within a given frame group, so that the user would be alerted when his data set had grown beyond a predetermined size. One might care to employ alternate recording modes, for example, shadow recording, in which the data is simultaneously written to two different disk tracks for reliability purposes, or data journaling, in which data is written simultaneously to a disk track and to a tape drive, again for reliability improvement, with respect to each virtual volume in a given frame group. Another control possibility is definition of a data migration threshold; that is, writing all the data in a given volume to tape when a certain percentage of the disk frame group has been filled. For example, the data migration threshold—that point at which the disk frame group is deemed full—might be so controlled. These data frame group attributes are typically established at the time of installation of the VSS system of the invention but might be altered by means of console commands or overridden by job control language parameters submitted with respect to a particular job. As indicated in FIG. 11 the VSS may control the data frame group assignment to extend over plural disk drives. This may be done, for example, to allow no two identical pages of a shadow-recorded data set to be written to the same disk drive, again for additional reliability.

Figure 13:
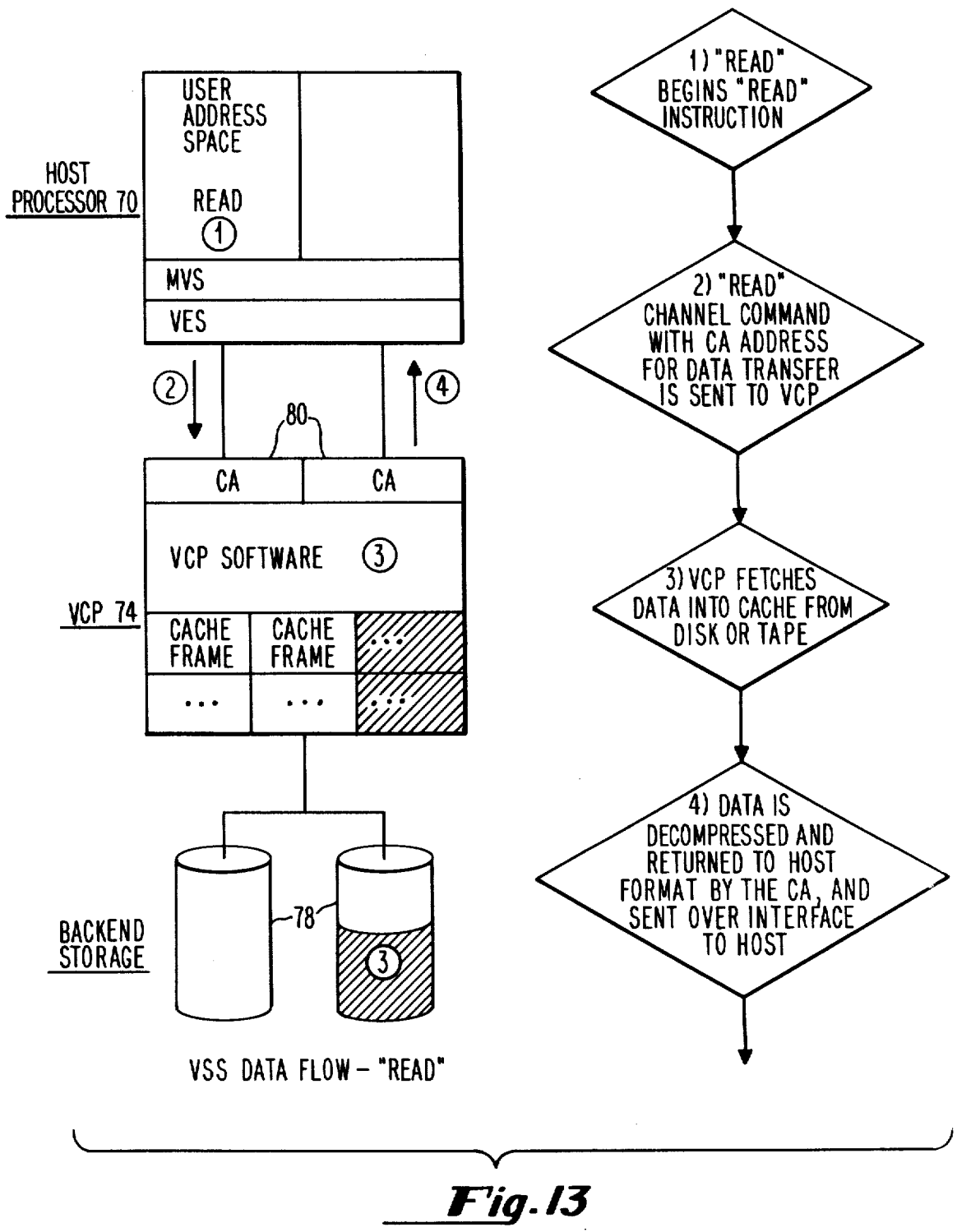
FIG. 13 shows a comparable view of the flow of data through the system of the invention.

Having thus defined the system configuration, examples of control and data flow are given in connection with FIGS. 12 and 13, respectively. Each figure comprises on the left a schematic depiction of the system and on the right shows a flow chart of the steps involved. Numbers showing each of the steps in the flow chart correspond to numbers shown on the block diagram to show the location of performance of the step in the flow chart. The control flow of an "OPEN" message, i.e., an order requiring preparation of a VSS data set for processing, is shown in connection with FIG. 12. If the user program contains the instruction OPEN, the virtual storage system execution subsystem software (VES), which in a preferred embodiment is added as noted to the IBM MVS operating system option, constructs an OPEN message for transferring over what appears to the host 70 to be a console interface; that is, the channel adapter 80 appears to the host 70 as if it were a console device, so that commands which would ordinarily appear on a console, are instead used by the channel adapter 80 and by the virtual control processor (VCP) 74 of the invention to take over these data management functions from the host.

If the host's request is for a new data set, the VCP 74 will assign a new virtual volume to this name. If the request is for access to an existing data set, the virtual control processor 74 will consult the address memory store 96 (FIG. 10) to locate the addresses of the various portions of the selected virtual volume. If the OPEN instruction is for a read operation, the virtual storage system of the invention will allocate several cache frames to the virtual volume to allow the first few pages of data to be written into the cache for transmission to the host. If the "OPEN" is instead for a write operation, one cache frame is allocated to the volume, as are a plurality of disk drive frames. This having been done, a response is generated and transmitted to indicate to the host that the virtual storage system of the invention is ready to actually receive the data. The response will comprise a volume serial number, indicating which volume has been identified as associated with the user data set name given, and a data stream identification, used to identify the channel adapter address to be used for the data transfer. This operation having been completed, data flow is possible.

The flow of data in a read operation is shown in FIG. 13. The data stream address which was passed back to the host 70 in the OPEN sequence described above is used to identify the channel adapter address. This permits any channel adapter 80 connected to the virtual control processor 74 with which is associated the requested virtual volume to be used for the transfer. The virtual control processor 74 then causes the requested data to be read into the cache one page at a time from the disk drive, or tape if the data has been migrated to tape, as the host requests the subsequent portions of the data sets. In this way the actual read requests are satisfied directly from the cache, permitting very high speed transfer and reduced access times on second and subsequent requests directed at a given data set. If the data had been compressed prior to storage, the channel adapter 80 decompresses the data and puts it into the host format while transferring the data over the interface to the host's buffers.

Figure 14:
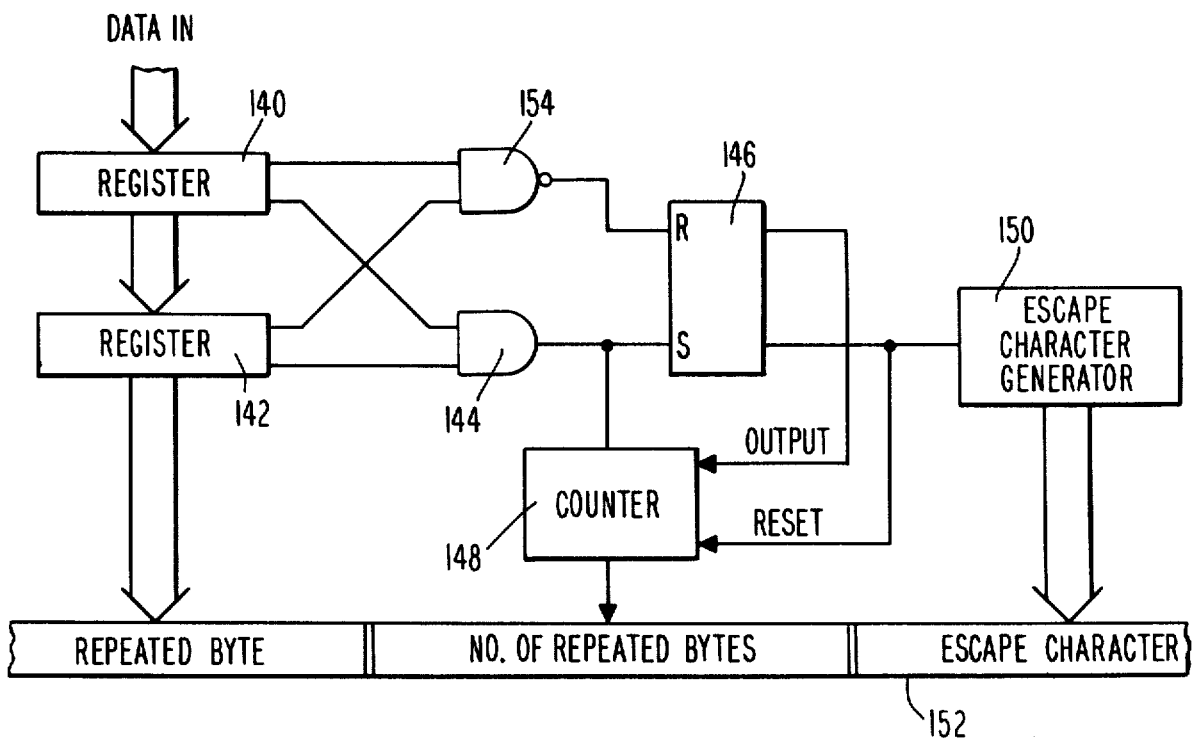
FIG. 14 shows a schematic diagram of hardware which might be used for data compression and decompression in the channel adapter of the system according to the invention.

FIG. 14 shows a schematic diagram of hardware which could be used to perform the data compression function. Data is shown being brought in at the left side of the diagram and read into a first register 140. Typically an eight-bit byte will be read into the register 140 upon each cycle of operation of the compression circuit. The eight bits are compared with eight bits stored in a second register 142 in a comparator 144. The comparator 144 is shown as an ordinary AND gate; it will be understood that the eight bits in register 142 are compared with corresponding ones of the eight bits in register 142. If the comparator 144 outputs a high signal, indicating that the data in register 140 is identical to that in register 142, a flip-flop 146 is set and a counter 148 is incremented. Upon the first setting of the flip-flop 146 the value stored in counter 148 is set to one. At the same time the first setting of the flip-flop 146 causes a so-called "escape character" generator 150 to output a predetermined "escape character" to the output bus of the circuit, indicated generally at 152. If the byte contained in register 140 is then moved to register 142, that in register 140 becomes the repeated byte, the number of repetitions of which is being counted by the counter. If the next byte read into register 140 is the same as the last, therefore, the flip-flop 146 being already set and the escape character having already been generated means that only the counter 148 will be incremented. The bytes contained in registers 140 and 142 are also compared in a second comparator 154 which is shown as a NAND gate, so that it has a high output whenever the contents of the two registers are not identical. This is passed to the reset input of flip-flop 146 which causes the counter contents to be output to the output bus 152 indicative of the number of times the repeated byte was repeated. This number together with an example of the repeated byte and the escape character is all that need be provided to perform data compression. It will be understood, of course, that if the escape character and the number of repeated bytes are equal in size to the byte, it will only be economical to perform such operations upon four or more identical repeated bytes. This object could readily be achieved by using four registers instead of the two shown, 140 and 142; for simplicity they are not shown. Those skilled in the art will also recognize that it is important to provide a method whereby the escape character can be distinguished from the same byte occurring "naturally" in the data. This may be done by repeating the escape character wherever it appears as natural data and detecting such repetition of this byte during the decompression routine, which is essentially the inverse of the compression methods just described.

Those skilled in the art will recognize that there has been described a virtual storage system adapted for connection between a host computer and a plurality of magnetic storage media which provides substantial improvements in systems operation characteristics. By providing the memory control intelligence external to the host, both the host and the user are relieved from the chore of determining where on magnetic storage media individual records are to be stored. Moreover, utilization of this external intelligence together with the concept of the virtual volume of undefined size allows data to be stored in block sizes determined by the memory system at the time of storage, rather than by the user in advance of actual data writing. This allows much higher utilization of data storage capacity.

Still another advantage provided by the invention is that it may be operated to store individual pages of data in frames within a data cache thus providing the advantage of solid state access time to the host, without storing all data in this very expensive form of memory. In this connection, the host software modification by which only sequential data sets are supported by (and directed to) the virtual storage system of the invention is of importance; randomly accessed data sets are not profitably cached, as they are not the subject of repeated READ commands. Similarly, randomly accessed data sets usually are relatively short, so that they do not need to be divided into subportions and stored in plural disk track-sized frames to enable efficient use of memory, as in the case of sequential data sets.

An additional advantage provided by the utilization of external intelligence in a memory system is great versatility in the recording modes used with respect to given types of data records; particularly as regards duplication for improvement of reliability. For example, provision of memory for storage of addresses at which data is stored external to the host allows back-up or duplicative storage of this data on different media if desired without intervention by the host or by the user. Furthermore, only those portions of records which are changed during processing during a given operating cycle, such as an eight-hour shift, need be backed up, in contravention of the prior art practice wherein if any part of a file was altered, the entire file had to be copied. Another advantage is that such back-up may be performed on tape such that entire reels of tape are written with the active portions of differing files; this yields complete utilization of the storage space available on tape.

Provision of intelligence in the memory subsystem also enables additional versatility in error correction and recovery operations. If an error occurs in reading or writing of a tape, for example, from the long-term storage into the cache, the system of the invention can automatically retrieve the back-up or shadow recorded copy without specific instructions from the host or operator. Similarly, simultaneous writing of one data file to two locations on disk which may be performed in the system according to the invention with respect to all records written without operator or host intervention, the disk frame groups having been defined. Finally, it will be appreciated that all the above improvements made in data processing systems by incorporation of the concepts of the invention are achieved at no cost to the host and will indeed be accompanied in some cases by an improvement in overall system performance due to the advantages of staging portions of data sets to the semi-conductor cache in advance of a read request, as well as improvements in the efficiency of storage usage with concomitant increase in either storage available or reduction in system size required to perform a specified function.

Filed herewith and incorporated by reference herein are the following documents:

"VSS Central Processor to Channel Adapter Interface Specification";
"Chapter 5: 'Firmware Implementation'";
"Z8000-CA Processor Flowcharts";
"8X300 Channel Sequencer Flowcharts"; and
"DFGM Procedure Descriptions".

These documents are intended to further detail and make clear certain important aspects of the invention herein.

The document entitled VSS Central Processor to Channel Adapter Interface Specification describes in detail the nature of the interface between the Magnuson central processor, as used in the presently preferred embodiment of the invention described above, and the channel adapter, which, as described above is a specially designed and manufactured hardware device comprising the Z8000 microprocessor and 8X300 channel sequencer units. It will be appreciated by those skilled in the art that the interface specification is very useful as it details the communications facilities required between the various intelligent subunits of the virtual storage system of the invention.

Chapter 5 "Firmware Implementation" describes in verbal terms the functions of the various subportions of the microcodes which execute on the Z8000 microprocessor and the 8X300 channel sequencer. This document describes the interplay between these two intelligent units, and taken together with the Z8000 CA Processor Flowcharts and the 8X300 Channel Sequencer Flowcharts also provided, fully details the microcode requirements and the detailed microcode implementation of the channel adapter.

Finally, the DFGM Procedure Description document describes a portion of the software which runs on the Magnuson central processor, or VCP, in the virtual storage system of the invention. The document provided describes the software which performs the function of UNS/D/ ASD (for Direct Access Storage Device, i.e., disk drives) UNS/F/ rame UNS/G/ roup UNS/M/ agement, hence the indication DFGM. The DASD Frame Group concept is described in this application in the discussion referrring to FIG. 11. Chapter 1 of the DFGM Procedure Description describes the data structure, detailing the variables which are used by the software to implement the data frame group management function. Chapter 2 of the document comprises verbal descriptions of the functions of the various subportions of this software. Those skilled in the art will recognize that this software is written in the programming language PASCAL. In the preferred embodiment, it runs on the Magnuson CPU using IBM's DOS/VS, Release 34 operating system.

It is believed that given the above description of the invention, together with the concurrently filed documents just described, those skilled in the art would have no difficulty in implementing the apparatus and method of the invention as claimed below.

While a preferred embodiment of the invention has been disclosed and described above, it will be understood by those skilled in the art that there are numerous modifications and improvements which can be made to the system of the invention without departing from its essential spirit and scope which is to be limited only only by the following claims.

I claim:

1. Apparatus for the storage of digital data organized into records comprising:
host interface means for receiving data from a host computer;
cache means connected to said host interface means for temporary storage of said data;
storage device interface means for connecting said cache means to one or more memory storage devices of one or more classes of storage devices for comparatively long-term storage of said data; and
controller means including address recall means, for:
(a) determining where said data is to be stored on said storage devices;
(b) controlling flow of said data from said host interface means through said cache means and said storage device interface means onto said storage devices; and
(c) storing the addresses at which said data has been stored on said storage devices;
whereby a given user-defined data set may be stored on a plurality of storage devices, selected from one or more classes of storage devices by said controller means.

2. The apparatus of claim 1 wherein each said data set is divided into pages of length convenient for storage on devices of said classes by said controller, which operates individually on each of said pages to determine where and on what class of storage devices said page shall be stored.

3. The apparatus of claim 1 wherein said host interface means comprises channel adapter means for compression of said data by replacing successive identical bytes of data by a compressed data word comprised of one of said identical bytes together with a character indicative of the number of times said identical byte was repeated in the uncompressed data.

4. The apparatus of claim 3 wherein said compressed data word additionally comprises a character for identification of said compressed data word as such.

5. A data processing and storage system, comprising:
at least one host computer for performing arithmetic and logic operations on digital data, an extremely high speed, relatively low capacity memory means in said computer, and interface means for transmitting and receiving data from external memory means; and
a virtual storage system, comprising:
relatively low speed, high capacity storage devices;
host interface means for receiving data from and transmitting data to said host;
a high speed, relatively low capacity cache memory means connected to said host interface means; and
a controller for allocating appropriate storage locations on said relatively low speed, high capacity storage devices for data received from said host and stored in said cache, for accordingly controlling the flow of data from said cache to said relatively low speed, high capacity storage devices, and for storing said storage locations.

6. The system of claim 5 wherein said relatively low speed, high capacity storage devices include devices of plural classes.

7. The system of either of claims 5 or 6, in which said host computer does not control the location of storage of said data on said relatively low speed, high capacity storage devices, nor the choice of class of device on which said data is stored.

8. The system of claim 5 wherein said data is divided by said controller into pages of convenient length for storage on said relatively low speed, high capacity storage devices and the location for storage of each said page is determined individually by said controller.

9. The system of claim 5 wherein said controller operates to store a single user-defined data set over plural storage devices as required, whereby a user of said system is not required to define the extent of storage locations for the containment of data sets operated on by said host.

10. The system of claim 5 wherein a single user identified data set may be divided into pages by said controller and stored on differing ones of said relatively low speed storage devices.

11. The method of operation of a data processing and storage system, said system comprising data processing means for outputting results of said processing for storage, and a data storage unit, said data storage unit comprising:
   plural types of addressable storage devices for long-term storage of said data; and
   controller means for allocating long-term storage locations within said long-term storage devices to said data and for controlling flow of data from said data processing means to said long-term storage devices;
   wherein the improvement comprises performing the step of determining where and on what type of addressable data storage device(s) the data is to be stored in said controller means, exclusive of the function of said data processing unit.

12. The method of claim 11, wherein data is stored on relatively higher speed storage devices, and is periodically copied to relatively lower speed storage devices.

13. The method of claim 12 wherein only that data stored on said relatively higher speed storage device in the interim following the last previous copying operation is copied.

14. The method of claim 11 wherein said data is simultaneously stored on differing ones of storage devices of the same type upon receipt in said data storage unit.

15. The method of claim 11 wherein said data is supplied by said processing unit to said storage unit in user-defined data sets, and said data sets are divided into pages by said controller for storage in said storage unit.

16. The method of claim 15 wherein the length of each said page is determined in accordance with the characteristics of the type of storage device on which storage locations for said pages are allocated.

17. The method of claim 11, further comprising the step of temporarily storing said data in said short-term memory means within said data storage unit during said step of determining at what long-term storage location said data is to be stored.

18. The method of claim 11 further comprising the step of compressing said data prior to said step of determining at what long-term storage location said data is to be stored.

19. The method of claim 18 wherein said data is divided into pages for storage assignment after said compressing step is performed.

20. A magnetic data storage system comprising means for receiving data from a host computer, means for temporary storage of said data, means for allocating locations on long-term storage media for said data, and for controlling flow of said data through said system, memory means for recall of said locations for long-term storage of said data, and means for periodically duplicating data stored in a first long-term storage location by copying it to a second long-term storage means, wherein said means for duplicating data is controlled such that said copying step is performed with respect to only that data which has been operated upon in the interim since the last preceding copying step, as indicated by said memory means for recall.

21. A data storage and recall system, comprising means for receiving data from means for processing data, means for long-term storage of said data, means for temporary storage of said data, means for allocating locations on long-term storage media for said data, means for controlling flow of said data through said system, memory means for recall of said locations for long-term storage of said data, and means for outputting said data upon instruction.

22. A data storage system for connection to a host computer, said host computer being adapted to indicate to said storage system that a particular data access request is one of a sequence of such requests to be directed to a particular user data set during execution of a particular user program, wherein said data storage system comprises:
   long-term, lower speed data storage means and shorter term, higher speed data storage means, where upon receipt from said host computer by said data storage system of a first data access command request directed to a portion of a user data set, said data storage system transfers a larger portion of said user data set than that requested from said large capacity, slower speed memory means into said smaller capacity, higher speed memory means in anticipation of further host access requests directed to said user data set.

23. The system of claim 22 wherein said user data set is divided into pages by controller means comprised in said storage system, said pages being stored on plural ones of long-term data storage devices, the locations of storage of said pages being retained in address memory means.

24. Method of operation of a data processing and storage system comprising a host computer system and a data storage system, said data storage system comprising:
   long-term magnetic storage media of relatively high capacity and relatively low speed, and
   short-term semi-conductor memory means of relatively low capacity and relatively high speed, wherein said host indicates to said storage system that a particular data access request is one of a series of access requests directed to a particular user-defined data set in execution of a user program, wherein said data storage system comprises processor means for responding to said indication by transferring portions of said user defined data set not called for by said host from said large capacity, slow speed magnetic storage means to said low capacity, high speed semi-conductor memory means in anticipation of further requests directed to said data set by said host in execution of said program.

25. The method of claim 24 wherein said user-defined data set is divided into pages, said pages being individually assigned to storage locations on plural ones of said long-term magnetic memory devices by said processor means.

26. A data storage subsystem for connection to a host computer by way of a channel comprising:
   magnetic disk data storage means;
   magnetic tape data storage means;
   solid-state cache data storage means;
   data bus means for transmission of data from said channel to said disk means, from said disk means to said cache means and from said cache means to said tape means; and controller means for directing the flow of data along said data bus means connecting said cache means, said channel means and said tape means unit, whereby a data set can be copied from a disk memory means into said cache and thence to said tape means.

27. The subsystem of claim 26 further comprising means for determining where and on what type of magnetic storage media said data is to be stored.

28. The subsystem of claim 26 wherein said means for determining further comprises means for division of a user data set into subportions sized in accordance with the physical characteristics of the media on which said subportions are to be stored.

29. The subsystem of claim 28 further comprising means for recall of the location at which said subportions are stored, and for reassembly of said subportions into a complete data set.

30. In a data storage subsystem adapted to be connected to a channel interfacing a host computer system with a data storage subsystem, the improvement which comprises:

said data storage subsystem comprising:
controller means;
disk storage means;
tape storage means; and
solid state cache memory means, said cache means being effectively connected to said magnetic disk storage means and to said magnetic tape storage means, said controller means controlling flow of data between said disk means and said cache means and between said cache means and said tape means, whereby upon indication that a given data set or portion of a data set should be copied to tape media for backup purposes, said data set or portion of a data set may be copied from said disk to said cache and thence to said tape.

* * * * *

UNITED STATES PATENT AND TRADEMARK OFFICE
CERTIFICATE OF CORRECTION

PATENT NO. : 4,467,421

DATED : August 21, 1984

INVENTOR(S) : Barry B. White

It is certified that error appears in the above-identified patent and that said Letters Patent is hereby corrected as shown below:

Column 12, lines 42 and 43: "UNS/M/ ultiple UNS/V/ irtual UNS/S/ torage" should read --"Multiple Virtual Storage"--.

Column 12, lines 66 and 67: "UNS/V/ irtual Storage System UNS/E/ xecution UNS/S/ ubsystem" should read --"Virtual Storage System Execution Subsystem"--.

Column 13, lines 14 and 15: "UNS/V/ irtual Storage System UNS/O/ perating UNS/S/ystem" should read --Virtual Storage System Operating System--.

UNITED STATES PATENT AND TRADEMARK OFFICE
CERTIFICATE OF CORRECTION

PATENT NO. : 4,467,421
DATED : August 21, 1984
INVENTOR(S) : Barry B. White

It is certified that error appears in the above-identified patent and that said Letters Patent is hereby corrected as shown below:

Column 14, lines 59 and 60: "UNS/V/ SS UNS/O/ perating UNS/S/ ystem" should read --VSS Operating System--.

Column 15, line 23: "UNS/V/ SS UNS/E/ xecution UNS/S/ ub-system" should read --VSS Execution Sub-system--.

Column 21, lines 32, 33, and 34: "UNS/D/ ASD (for Direct Access Storage Device, i.e., disk drives) UNS/F/ rame UNS/G/ roup UNS/M/ agement" should read --DASD (for Direct Access Storage Device, i.e., disk drives) Frame Group Management--.

Signed and Sealed this

Twenty-fourth Day of February, 1987

Attest:

DONALD J. QUIGG

*Attesting Officer*　　*Commissioner of Patents and Trademarks*

UNITED STATES PATENT AND TRADEMARK OFFICE
CERTIFICATE OF CORRECTION

PATENT NO. : 4,467,421

DATED : August 21, 1984

INVENTOR(S) : Barry B. White

It is certified that error appears in the above-identified patent and that said Letters Patent is hereby corrected as shown below:

Page 1, Line 2,    Replace "Continuation-in-part of Ser. No. 261,950" with --Continuation-in-part of Ser. No. 261,951--.

Signed and Sealed this

Eighth Day of May, 2001

*Attest:*

NICHOLAS P. GODICI

*Attesting Officer*    *Acting Director of the United States Patent and Trademark Office*